United States Patent [19]

Fowells et al.

[11] 3,882,095

[45] May 6, 1975

[54] PROCESS FOR FORMING POLYOLEFIN FIBERS

[75] Inventors: Robert W. Fowells; Robert A. Damon; James G. Coma, all of Vancouver, Wash.

[73] Assignee: Crown Zellerbach Corporation, San Francisco, Calif.

[22] Filed: Mar. 16, 1972

[21] Appl. No.: 235,416

Related U.S. Application Data

[63] Continuation-in-part of Ser. No. 69,194, Sept. 3, 1970, abandoned.

[52] U.S. Cl.... 260/88.2 R; 260/94.9 B; 260/94.9 F; 260/94.9 GD; 264/205
[51] Int. Cl. ....... C08f 47/00; C08f 1/88; C08f 1/92
[58] Field of Search.... 260/94.9 F, 94.9 GD, 94.9 B

[56] References Cited
UNITED STATES PATENTS

| | | | |
|---|---|---|---|
| 3,119,801 | 1/1964 | Haskell | 260/94.9 GD |
| 3,607,793 | 9/1971 | Mahlman | 260/94.9 GD |
| 3,743,272 | 7/1973 | Nowotny et al. | 260/94.9 GD |

OTHER PUBLICATIONS

Keller and Willmouth, Die Makromolekulare Chemie, 121, pp. 42–50 (1969).

*Primary Examiner*—Harry Wong, Jr.
*Assistant Examiner*—A. Holler

[57] ABSTRACT

The process of forming polyolefin fibers comprising polymerizing an olefin in a solvent or dissolving a high molecular weight polyolefin in the solvent at a temperature above the melt dissolution temperature of the polyolefin to be formed, and cooling the reaction mass to a temperature below the melt dissolution temperature to form a fibrous gel containing polyolefin microfibrils, macrofibrils and fibers.

17 Claims, 2 Drawing Figures

PROCESS FOR FORMING POLYOLEFIN FIBERS

This application is a continuation-in-part of Ser. No. 69,194, filed Sept. 3, 1970, now abandoned.

BACKGROUND OF THE INVENTION

The polymerization of olefins into polyolefins is well established in the art. Early processes employed the high pressure procedure to produce low density polyethylene. More recently, the use of coordination catalysts has permitted the polymerization of olefins to be effected at lower pressures to produce high density polyolefins.

The formation of fibers or filaments of polyolefins has previously been effected by extruding the polyolefin through spinnerets with the formation of continuous filament lengths, with subsequent chopping of such filaments into staple fibers.

Another approach has been to form so-called "fibrids". The formation of such fibrids is described in U.S. Pat. Nos. 2,999,788; 2,988,782; and 2,708,617.

All of these prior art processes require the formation of the polymeric material first, with subsequent conversion into fibers. The first of the prior art processes mentioned involves the general steps of polymerizing the monomer to the polymer, precipitating the polymer as a crumb from the reaction medium, forming the precipitated polymer into pellets, heating the pellets and extruding them through spinnerets to form filaments, and chopping the filaments into staple. The second type of prior art process (fibrids) involves forming the polymer and redissolving the polymer to precipitate it in the form of fibrids. As is seen by the number of steps involved, such processes are relatively expensive in view of the large number of intermediate handling steps. In addition, there is a practical upper limit on the molecular weight of the polymer employed in such prior art processes because of viscosity limitations.

A process has recently been invented whereby polyolefin fibers may be formed directly from olefin monomers during polymerization. This process is described in copending application Ser. No. 874,687, filed Nov. 6, 1969 (which is a continuation-in-part of U.S. Ser. No. 769,501, filed Oct. 22, 1968). In the process described in the aforementioned application, olefins are polymerized in a suitable reaction medium in the presence of a coordination catalyst at a relatively high reaction rate and under conditions of relatively high shear stress to produce fibers directly which have a gross morphology and size similar to natural fibers. Such fibers will be referred to hereinafter as "free floating fibers". The free floating fibers thus manufactured are made up of "macrofibrils" which generally have a diameter greater than about 1 micron.

Another recent process has been invented for forming polyolefin fibers by first forming a fibrous gel containing relatively high molecular weight polyolefin microfibrils, macrofibrils and fibers, and then mechanically refining the gel to liberate and/or form polyolefin fibers therefrom. This latter process is described and claimed in copending application Ser. No. 27,053, filed Apr. 9, 1970. In the process described in said copending application Ser. No. 27,053, it is taught that the process should be carried out below the melt dissolution temperature of the polyolefin to be formed in order that the microfibrils, macrofibrils and fibers would not be detrimentally affected.

SUMMARY OF THE PRESENT INVENTION

The present process forms linear polyolefin fibers of the type described in the aforementioned copending application Ser. Nos. 874,687 and 27,053, by first polymerizing the olefin in a suitable solvent at a temperature above the melt dissolution temperature of the polyolefin to be formed, and cooling the polymeric solution to below the melt dissolution temperature to form a fibrous gel containing relatively high molecular weight linear polyolefin microfibrils, macrofibrils and fibers. Alternatively, a high molecular weight linear polyolefin may be dissolved in a suitable solvent at a temperature above the melt dissolution temperature and cooled to form the fibrous gel. The fibrous gel may then be refined to liberate and/or form polyolefin fibers.

DESCRIPTION OF PREFERRED EMBODIMENTS

Figure 1:
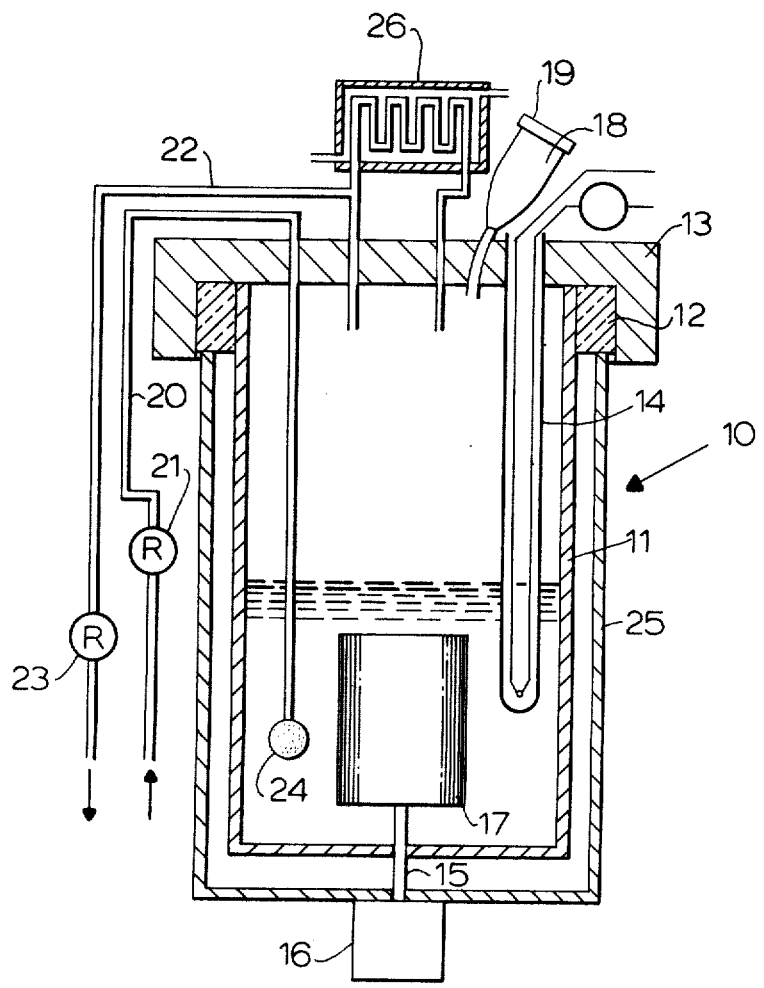
FIG. 1 is a schematic representation of one form of apparatus suitable for forming the fibrous gel by the process of the present invention.

The present process is somewhat related to the processes described in copending applications Ser. Nos. 874,687 and 27,053. In the process described in copending application Ser. No. 27,053, a fibrous gel of polyolefin is formed, and polyolefin fibers liberated and/or formed therefrom by mechanical refining. In this latter process, it is taught that the polymerization must be carried out at temperatures below the melt dissolution temperature of the polyolefin to be formed, as otherwise the polymer would be in solution instead of being present as a fibrous gel made up of microfibrils, macrofibrils and fibers.

Similarly, in the process described in copending application Ser. No. 874,687, wherein free-floating fibers of polyolefins are formed during polymerization, it is taught that the polymerization temperature must be below the melt dissolution temperature of the polyolefin in the reaction solvent employed, as otherwise the polymer would be in solution and not present as free-floating fibers.

Herein, the fibers formed by the process of Ser. No. 874,687 or by process of Ser. No. 27,053 or the present process after refining of the fibrous gel are referred to as free-floating fibers to distinguish over the fibrous gel. The fibers in fibrous gel (as herein defined) contain a significant quantity of sorbed solvent and are more in the nature of a solution of solvent in polymer, whereas free-floating fibers do not contain a significant amount of sorbed solvent and are in the nature of a dispersion in the solvent.

"Fibrous" gel is defined as a fibrillar structure of fibrous linear polyolefin having interconnecting capillary spaces filled with the reaction medium. By fibrous linear polyolefin, it is intended to include both microfibrous polyolefin and macrofibrous polyolefin, as well as fibers. Generally, therefore, the polymer in the gel is in the form of microfibrils, macrofibrils, fibers and/or lamellae, and the proportion of these is dependent upon the history of the gel. As previously mentioned, by "macrofibrils" it is intended to mean microscopic fibers having a diameter greater than about 1 micron up to about 20 microns, and microfibrils are microscopic fibers having a diameter less than about 1.0 micron. "Fibers", in the sense employed herein, have a diameter ranging upward from about 10 microns.

The fibrous gel of the present invention is made up of about 0.5 to 50% by weight and preferably 3–30% by weight of the polyolefin, with the remainder being the reaction medium, and minor amounts of catalyst and whatever is employed to stop the polymerization reaction, such as ethyl or isopropyl alcohol if the polymer solution was prepared by direct polymerization.

Wherever polyolefin polymer is referred to herein as being "crumb", it is intended to mean non-fibrous polyolefin particles.

It has now been discovered that polymerization may be carried out at temperatures above the melt dissolution temperature of the polyolefin to be formed, and a fibrous gel prepared from the resulting polymer solution by cooling below the melt dissolution temperature, preferably under condition of shear stress.

It is desirable for satisfactory fiber formation that the polymerization be carried out so as to form a polyolefin having an ultra-high (viscosity average) molecular weight which, in the case of polyethylene, is in excess of about 250,000 and preferably in excess of about 500,000. If the polymerization is not carried out to provide a minimum viscosity average molecular weight of at least about 100,000, few or no microfibrils will be formed and the polymer will consist almost entirely of lamellae. While a solution of polyolefin having a molecular weight as low as about 40,000 can sometimes be formed into fibers by the process described herein, the fibers thus formed are weak and brittle compared to the fibers made up of microfibrils and macrofibrils, in accordance with the preferred embodiment of the present process.

Alternatively, instead of polymerizing the olefin above the melt dissolution temperature, a previously prepared crystalline polyolefin of suitable molecular may be dissolved in the solvent at such temperature, and the resulting polymer solution treated in the same manner as for the polymer solutions formed by direct polymerization to form polyolefin fibers. In the case of polyethylene, the preformed polymer is desirably a crystalline high density polyethylene.

Once the polyolefin solution is obtained, whether by direct polymerization or by dissolving preformed polyolefin, it is cooled to below the melt dissolution temperature. As the polyolefin solution is cooled, it is desirably subjected to at least a minimal shear stress, such as gentle agitation, to effect fibrous gel formation.

While shear stress is easily measured in simple shear devices, such as a cylindrical rotor rotating in a cylinder or flat blade stirrer, it is very difficult to measure in more complex geometries. Also, the exposure of any particular portion of a body of liquid to the shear zone is a complex consideration. Therefore, a relatively simple method of measuring shear stress in any shear geometry has been devised. This method is based upon the employment of microcapsules which rupture only at the critical shear stress of 0.1 pounds (force) /sq. ft. (5 newtons/sq. meter) or greater.

Suitable microcapsules are those designated H-85 and obtained from Balchem Corporation of Slate Hill, N.Y. These microcapsules pass a 16-mesh Tyler screen but are retained on a 20-mesh screen. These microcapsules are elliptical-shaped with some concavities. The major axis was 1203.6 $\mu$ (standard deviation of 141.3) and the minor axis was 1041.4 $\mu$ (standard deviation of 92.7). The shell wall thickness of the microcapsules prior to treatment was 33.1 $\mu$ (standard deviation of 13.0). They have a gelatin shell and contain 42.6% by weight toluene.

These microcapsules were soaked in a 35.5% by weight mixture of water in isopropanol for one hour. They were then placed on a screen and dipped into isopropanol for 5 seconds to reharden the gelatin shell.

The microcapsules were then placed into 260 cc of cyclohexane in a cylindrical vessel 8 inches in height and 3.028 inches in diameter. The microcapsules are added to give a concentration of 0.2 grams/liter. The vessel had a coaxially disposed rotor 2.838 inches in diameter and 8 inches long. The gap between the rotor and vessel wall was 0.2413 cm. The temperature of the cyclohexane was 26°C. (viscosity of 0.884 centipoises). The rotor was rotated at 3615 rpm for 5 seconds. The shear stress in the gap was 0.1 pounds (force)/sq. ft. (5 newtons/sq. meter). All of the capsules ruptured as indicated by the amount of toluene present in the cylcohexane. At less than 0.1 pound (force)/sq.ft. shear stress, none of the capsules ruptured.

Capsules thus prepared may then be placed into any shear system in an amount of 0.2 grams/liter and the system subjected to the shear employed in the process for the usual process time. The number of capsules ruptured is then determined by analyzing for toluene by conventional analytical techniques such as gas chromatography or ultraviolet spectroscopy.

It has been determined that to form fibrous gel (rather than the free fibers of Ser. No. 874,687) less than 80% of the capsules should rupture in the shear system. This means that a significant portion of the system has been exposed to a shear stress less than 0.1 pounds (force)/sq.ft. The 80 % limit was determined by employing the residence time distribution concept set forth in Chapter 9 of Chemical Reaction Engineering, Octave Levenspiel, John Wiley & Sons, Inc., N.Y., 1962.

Briefly, these concepts are as follows. A fraction (S) of fluid passes through the sheer zone during each cycle. The fraction not passing through the shear zone is (1-S), and the fraction not passing through the shear zone after (n) cycles is (1-S)$^n$. The numbered cycles (n) is calculated from the total time and the number of cycles per unit time (w). This latter quantity (w) is determined by the tracer technique described in the Levenspiel reference cited above using the relationship $$w = \frac{1}{\int_{0.6b}^{\infty} t\, E(t)\, dt}$$

wherein
w = number of cycles per unit time
t = time
E(t) = first passage time distribution of tracer through the shear zone The fraction of capsules passing through the shear zone (determined by the amount of toluene released since all capsules passing through a shear zone in excess of 0.1 pounds (force)/sq. ft. rupture) is 1 − (1-S)$^n$.

From experimental data it has been found that if $1 - (1-S)^n$ is less than 0.80 (80% rupture) fibrous gel is formed, whereas if more than 80% of the capsules rupture ($1-(1-S)^n > 0.8$) the free fibers of Ser. No. 874,687 are formed.

While specific microcapsules are described above for determining whether the critical shear stress of 0.1 pounds (force)/sq. ft. is exceeded or not, any microcapsule containing a material which can be measured in the sheared medium can be employed. The gelatin shell thickness can be reduced to proper value for rupture at 0.1 pounds(force)/sq.ft. by the water-isopropanol soaking technique described above. This is done by using various concentrations of water in isopropanol and determininng whether or not the capsules rupture under 0.1 pounds (force)/sq.ft. in a known shear stress zone such as the rotor-cylinder apparatus described above. Once the appropriate microcapsules are formed, they may then be reproduced for use in testing the shear stress in the unknown system. The microcapsules can be designed by this technique to rupture at about any shear stress level and a fairly accurate determination of shear stress made in the unknown system by analyzing a series of microcapsules rupturing under known shear stress levels.

Olefinic monomers which may be polymerized to form the fibers of the present invention are any of those which can be polymerized by the employment of a coordination type of catalyst. The preferred monomers are the monoolefins, ethylene and propylene. Other olefins which may be employed are diolefins such as butadiene and isoprene; alpha olefins such as 1-butene, 1-pentene, 1-dodecene and 4-methyl, pentene-1; cycloalkyl and aryl substituted olefins such as vinyl cyclohexane and styrene. In addition to forming fibrous homopolymers of the foregoing olefins, fibrous copolymers and block copolymers may be formed by the employment of mixtures of the foregoing olefins.

Any of these coordination type or stereospecific catalyst systems employed in the art for the polymerization of olefinic monomers may be employed in the process of the present invention. Especially preferred are the Ziegler type of coordination catalyst systems, which are generally a combination of a catalyst and a cocatalyst. The catalyst is a compound (usually an oxide or halide) of a transition metal from groups IVB–VIIIB and group VIII of the periodic chart, and the cocatalyst is a metal alkyl where the metal is from groups IA, IIA, IIB or IIIA of the periodic chart. The periodic table referred to is that in "Handbook of Chemistry", by Lange, seventh edition, pps. 58–59. Any conventional Ziegler type catalyst system, such as those described in Belgian Patents 533,362; 534,792; and 534,888 may be employed in the present process. Three component Ziegler type catalysts may also be employed, and appear to have special utility where propylene is the olefinic monomer.

The preferred Ziegler catalysts and cocatalysts for polymerizing ethylene are as follows: preferred catalysts, in order of increasing activity in fiber formation, are titanium trichloride, titanium tetrachloride, vanadium tetrachloride and vanadium oxytrichloride; preferred cocatalysts, in order of increasing activity, are dialkyl aluminium halides such as diethyl aluminium chloride and trialkyl aluminum compounds such as triethyl aluminum.

The ratio of cocatalysts to catalysts (i.e. alumnium: titanium or aluminium: vanadium) employed is preferable in the range of 1:1 and 3:1, although ratios as low as about 0.4:1 and as high as 50:1 or higher (with vanadium catalysts) are employable.

The preferred coordination catalyst systems and ratios for polypropylene and other olefinic monomers are those generally recognized in the art to give high reaction rates, although a high reaction rate is not essential to the present invention.

The catalyst concentration employed in the reaction medium is not per se critical to gel or fiber formation, and conventional concentrations may be employed.

While the Ziegler type coordination catalyst is preferred, other types of coordination catalysts are also suitable. Exemplary of these other types of coordination catalysts are the Phillips catalysts and the catalysts of the Standard Oil Company of Indiana. The Phillips solution process is described in U.S. Pat. No. 2,825,721; the Phillips slurry process is described in British Patent 853,414. The Standard Oil process is described in U.S. Pat. Nos. 2,691,647; 2,726,231; 2,726,234; 2,728,758; 2,773,053; 2,791,575; 2,795,574 and 2,834,769.

The pressure employed in the polymerization reactor to form the fibrous gel may be any pressure conventionally employed for the particular type of olefin to be polymerized and the coordination catalyst used. However, it may be desirable to employ a higher pressure than conventionally employed in order to increase the reaction rate. Thus, if a Ziegler type coordination catalyst is employed, and the olefin is ethylene or propylene, pressures conventionally employed in the art are generally from substmospheric up to about 100 atmospheres for the process of the present invention such pressures may also be employed, but if it is desired to increase the reaction rate and form polyolefins having viscosity average weights of 10 million to 20 million or higher the range of pressures employed may be 35 to 50 atmospheres or higher. For the Phillips solution and slurry processes, pressures may typically range up to 35 atmospheres. In the Standard Oil polymerization process, pressures in the range of 35–105 atmospheres are typically employed.

The temperature employed in the polymerization reactions of the present invention is maintained between about the melt dissolution temperature of the polymer to be formed and the decomposition temperature of the solvent or polymer. It is preferred to operate between the melt dissolution temperature and that temperature at which the polyolefin superstructure is destroyed. This temperature, which shall be called the "temperature of molecular randomization", is the temperature at which birefringence of the polymer solution disappears and can be determined by use of conventional techniques. If the temperature of polymerization or temperature of dissolution of a preformed polyolefin is above the temperature of molecular randomization, it has been found that the polyolefin solution must be subjected to an increse in shear stress during cooling in order to form a satisfactory fibrous gel. It is generally preferable to operate between about 110° C. and about 165° C. for polyethylene.

The melt dissolution temperature of any particular polyolefin in a solvent is easily determined. Low concentrations of the polyolefin (e.g., 0.1 and 1.0 by weight) are placed into the solvent in a vial, which is sealed and placed in an oil bath. The temperature of the oil bath is raised slowly (10° C. hr.) until the last trace of polymer disappears. This temperatuure is the melt dissolution temperature. For ultra-high molecular weight (about 10 million) polyethylene at low concentration (0.1% by weight) in cyclohexane, the melt dissolution temperature is 118.5 ± 1.9° C. at autogeneous pressure. For a dilute solution of high molecular weight polypropylene in cyclohexane, the melt dissolution temperature is 130° C. At higher concentrations the melt dissolution temperature approaches the melting point of the polyolefin. Lowering of molecular weight lowers the melt dissolution temperature at a given concentration.

As is the case with the formation of polyolefin fibers described in copending applications Ser. Nos. 874,687 and 27,053, the reaction medium employed in the process of the present invention is also important to the formation of fibers. The medium employed must essentially meet the same requirements set forth in the aforementioned patent applications. Generally, the medium employed should be a suitable reaction medium for the polyolefin to be formed during the polymerization reaction. By the term "suitable reaction medium", it is intended to mean a solvent composition in which the polyolefin to be formed is soluble, does not affect the catalyst and forms a homogeneous single phase.

A more accurate characteristic of a suitable reaction medium is the "solubility parameter" (S) or "cohesive energy density" ($S^2$) of the "solvent". The cohesive energy density is especially useful for predicting the solubility and solvent sensitivity of polymers. Polyolefins are soluble only in those solvents whose solubility parameter or cohesive energy density is not too far different from their own.

A detailed discussion of solubility parameter and cohesive energy density is set forth in copending application Ser. No. 874,687, and in the book "Polymer Handbook", edited by Brandrup and Immergut, Interscience Publishers, 1966, pps. IV-341,068; and in "Encyclopedia of Polymer Science and Technology", Vol. 3, Interscience Publishers, pps. 833–62.

In order to qualify as a suitable reaction medium for forming a solution of polyethylene, the reaction solvent chosen should preferably be between about 6.5 and 9.5 (cal/cc)$^{1/2}$, and probably should not be outside the range of 6.0 – 10.0 (cal./cc.)$^{1/2}$.

The solubility parameter of polyethylene at 25°C. is about 7.9 – 8.3 (cal./cc.)$^{1/2}$.

The solubility parameter of polyethylene at any temperature "T" can be determined by the following equation:

$$\delta_{PE} = 8.4822 - 0.00642 \times (T°C).$$

Similarly, the reaction medium chosen for polypropylene formation should desirably have a solubility parameter approaching 7.9 – 8.2 (cal./cc.)$^{1/2}$. The preferred range is between about 6.0 and 10.0 (cal./cc.)$^{1/2}$.

Solubility parameter values for polyolefins other than polyethylene and polypropylene are to be found in Table 4, pages IV-362-67 of "Polymer Handbook", cited above, or can be calculated as set forth in copending application Ser. No. 874,687. It should be noted that the solubility parameters set forth in "Polymer Handbook" are calculated from the heats of vaporization at 25°C., and that different values will be obtained at the more elevated temperatures employed herein. At such elevated temperatures, the solubility parameter may approach close enough to that of the polyolefin to be formed to be a useful reaction medium, whereas at lower temperatures it would not be useful.

An alternate approach to the definition of solubility characteristics of solvents useful in the practice of the present invention is difference in solubility parameter ($\delta_s - \delta_p$) of the solvent and polyolefin. The heat of mixing of solvent and polyolefin is dependent upon the quantity $(\delta_s - \delta_p)^2$. If the hreat of mixing is not so large as to prevent mixing, then $(\delta_s - \delta_p)^2$ has to be relatively small. For polyethylene and polypropylene it has been determined that $(\delta_s - \delta_p)^2$ should desirably be less than about 3.0 (cal./cc).

While the foregoing discussion of suitable reaction media has been directed to that aspect of the present invention where polymerization is carried out, the same criteria as to suitable media applies to that aspect of the invention wherein a preformed polyolefin is dissolved at an elevated temperature. In addition there can be used solvents having a proper solubility parameter that would kill catalyst if used as a reaction medium.

In copending application Ser. No. 874,687, it is disclosed that one of the principal factors contributing to the formation of polyolefin free-floating fibers is the shear stress to which the reaction mass is subjected during polymerization. In the present process the formation of such fibers during the polymerization reaction is not possible since they would be dissolved, if formed. Therefore, the shear stress to which the reaction mass of the present invention is subjected during polymerization is not critical, and no shear stress need be employed.

The polymerization reaction rate is not critical for fibrous gel formation in the present process. Since the reaction is carried out at high temperatures, the reaction rate has been found to be, inherently, high enough to effect fibrous gel formation. However, it has been found that fiber properties are affected by reaction rate. In general, it has been found that fiber strength properties are improved with an increase in reaction rate.

Upon completion of polymerization in the high temperature, solution process, the polyolefin solution is cooled to a temperature below the melt dissolution temperature of the polyolefin to form a fibrous gel. The rate of cooling is not critical to formation of fibrous gel and can vary over a wide range of from as low as about ½°F. a minute up to substantially instantaneously. It is important however, to effect the cooling under conditions such that any solvent that may vaporize during cooling is not in excess of that amount which gives a fibrous gel having at least 50–70% by weight solvent. It is not necessary that the cooling rate be constant. It is preferred to employ a slower cooling rate for the production of longer fibers. For example, at a cooling rate of 4°F. per minute, fibers average 10–15 mm in length, whereas at higher cooling rates the fibers are shorter.

During cooling of the polyolefin solution, it is desirable to subject the solution to shear stress to effect fibrous gel formation. It is not essential to subject the solution to shear stress where the polyolefin has been formed in the reaction medium but where the polyolefin is preformed and subsequently dissolved, or where the polyolefin is formed between the melt dissolution temperature and subsequently raised above the temperature of molecular randomization, or where the polyolefin is formed initially above the temperature of molecular randomization, it is important that the solution be subjected to a minimum shear stress upon cooling to effect satisfactory fibrous gel formation. This will be shown in the specific examples.

After formation of the fibrous gel, the gel is subsequently refined to liberate and/or form discrete fibers of polyolefin therefrom. The word "refined" as employed for this step of the process is not intended to mean the ultimate preparation of the fibers for their end use, such as in making nonwoven webs or in spinning yarns. The phrase "refined" as employed herein is intended to mean that step wherein polyolefin fibers are liberated and/or formed from the gel.

Refining is accomplished by subjecting the fibrous gel to a shear stress great enough to liberate and/or form fibers therefrom. The minimum shear stress required is dependent upon numerous factors and an absolute value therefor cannot be stated without taking these factors into consideration. However, in general, it is desirable that the shear stress be above about 0.1 to 1.5 lbs. (force)/sq.ft. The shear stress should not be so great as to detrimentally affect the fibers.

Refining is preferable accomplished by subjecting the gel to attritional forces, preferably in the presence of reaction medium. This may be accomplished by the use of several types of apparatus such as the conventional type of disc refiners employed in the papermaking art. Other types of papermaking refining equipment suitable for forming and/or liberating the fibers from the gel include the PFI mill, Dyna Pulper and Jordans. The type of equipment employed is not critical, it being necessary only to impart to the fibrous gel sufficient attritional forces or shear stress to liberate and/or form fibers therefrom. The magnitude of mechanical forces necessary to accomplish this is readily determinable for the particular type of equipment employed. The only upper limit on the degree of agitation imparted to the gelatinous mass is that it should not be so high as to cause undue chopping of the fibers into a form which may be unsuitable for the ultimate end use.

Whereas the liberation of already formed fibers in the gel involves separation, the mechanism involved in the concurrent fiber formation from the microfibril and macrofibril portion of the polyolefin gel described hereby by such refining action is not completely understood. It is hypothesized that agitation of the gel during refining causes the microfibrils and macrofibrils to align themselves into fibers. Microscopic analysis of the polyolefin fibers thusly formed shows them to be made up of such macrofibrils.

Once the fibers are formed from the gel by refining, the reaction medium and catalyst may be removed therefrom by conventional techniques. Further mechanical treatment of the fibers to separate discrete fibers from fiber bundles may be effected by conventional defibering techniques, such as in a disc refiner.

One of the unique features of the present process is that it provides fibers (after refining) which can have a sorbed solvent content at room temperature (20°C.) up to about 90% by weight of the total solvent-fiber mass. By "sorbed" solvent is meant solvent present as absorbed and adsorbed solvent. The amount of such sorbed solvent can be controlled by the amount of drying, solvent extraction, mechanical expression, steam distillation, or other conventional means of solvent removal from the fibers obtained after the refining step.

The presence of such sorbed solvent has been found to aid fiber bonding and it is preferable to have a minimum of ½% by weight (20°C) retained for this purpose. However, once the solvent is removed, it cannot be resorbed to provide the same degree of fiber bonding.

The viscosity-average molecular weight ($\overline{M}_v$) of the polyolefins produced in the present process ranges up to about 20 million and above, preferably between about one-half million to about 20 million in view of the improved strength properties over fibers of lower molecular weight polyolefins. The molecular weight can be controlled to any value desired in the conventional manner of employing chain termination agents. However, if the molecular weight ($\overline{M}_v$) falls below a certain minimum value, which for polyethylene and polypropylene is about 40,000 to 250,000, fibers will not be obtained upon refining. Therefore, it is generally very desirable to carry out the polymerization in the absence of any chain transfer agent.

The range of molecular weight distributions of the linear polyolefins such as polyethylene produced by the present process (as measured by the ratio of the weight-average molecular weight ($\overline{M}_w$) to number-average molecular weight ($\overline{M}_n$) appears to be within the range reported in the literature for most common commercial grades.

The density range of the polyolefins obtained by the present process appears to be somewhat broader than that normally obtained by polymerization with a coordination catalysts.

One of the most distinguishing features of polyolefin fibers formed by the process of the present invention is the high surface area provided, due at least in part to the microfibrillar and macrofibrillar structure of the fibers. Staple polyolefin fibers typically have surface area (as measured by the conventional gas adsorption technique) of much less than about 1.0 square meter/g. For example, 3 denier melt spun polyethylene staple has a surface area of about 0.16 m$^2$/gram. Cellulose fibers (Whatman No. 1 filter paper) have a surface area of about 1.0 square meter/gram. The polyolefin fibers of the present invention generally have a surface area greater than 1.0 square meter/gram, generally higher than about 25m$^2$/gram, and as high as 100 m$^2$/gram or higher.

The fibers of the present invention are not completely uniform in cross-section along the length thereof. This is an advantage over staple fiber which have a uniform cross-section, because such nonuniformity contributes to the web forming properties of the fibers. A majority of the fibers of the present invention are irregular in cross-section, rather than ribbon-shaped.

When the fibers of the present invention are classified according to TAPPI standard test No. T-233 SU-64 using the Bauer-McNett classifer (having screens of 20, 35, 65, 150 and 270 mesh arranged in sequence), more than 50% by weight are retained on the 150 mesh or coarser screens. Polyolefin pulps may be made having an average diameter of a majority of the fibers (by weight) exceed about 10 microns; such pulps are particularly useful for making synthetic papers. The average length of a majority of the fibers (by weight) is greater than 250 microns. The average length to diameter ratio of the fibers is greater than 5:1, and a majority of the fibers (by weight) have a length to diameter ratio greater than 10:1. Fibers having a diameter up to 600 microns or higher and lengths up to 4mm or more have been observed.

The fibers of the present invention have great utility in making nonwoven webs, particularly by normal papermaking techniques wherein the fibers are deposited from an aqueous slurry upon a moving foraminous forming surface such as a Fourdrinier wire. It has been found that sheets formed from the fibers of the present invention have extremely high opacity, which is quite useful in printing and other types of papers. The fibers of the present invention may be mixed with cellulose fibers to improve the opacity of paper formed therefrom. A particularly useful mixture is up to 50% polyolefin fibers mixed with cellulose fibers.

Prior to discussing the specific details of examples illustrating the present process, a brief description of a suitable apparatus for carrying out the process of the present invention will be presented.

Reference is made to FIG. 1 of the drawing in which reference numeral 10 refers to the reactor of the first type. The reactor 10 is comprised of a cylindrical reaction vessel 11 fitted with a ground glass collar 12. A resin kettle lid 13 is located on top of the reactor, sealing it from the atmosphere. Located inside the reaction vessel is a thermocouple well 14. Through the bottom of cooling jacket 25 and reaction vessel 11 is a shaft 15 attached at the outside end thereof to a variable speed motor 16 and having at the other end thereof inside the reactor a cylindrical agitator 17. Side arm 18 protrudes through the lid 13 into the interior of the reactor and is fitted at the outside end with a serum cap 19 for catalyst addition via hypodermic syringe. Monomer inlet 20 traverses through the lid 13 and is fitted with a rotameter 21 for measuring gaseous monomer flow rates. The end of monomer inlet conduit 20 located inside the reaction vessel is fitted at its extremity with a fritted glass dispersion tip 24 to effect dispersion of the gaseous monomer in the polymerizing solvent. Excess gaseous monomer is withdrawn from the reactor via conduit 22, which is likewise fitted with a rotameter 23 to measure the exit gaseous monomer flow rate. Reflux condenser 26 returns condensables to the reaction vessel 11.

Figure 2:
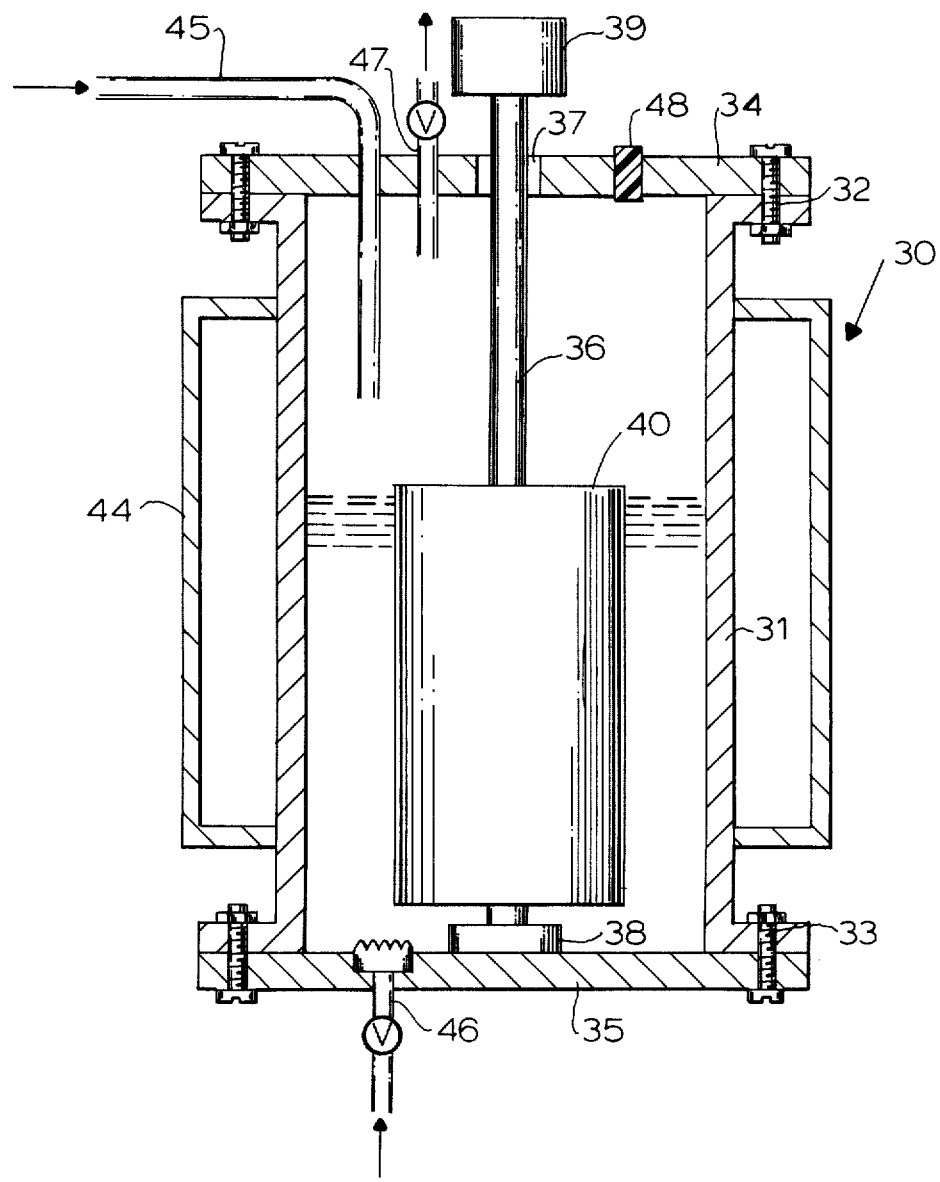
FIG. 2 is a schematic representation of one form of apparatus suitable for forming the fibrous gel or free-floating fibers of the process of the present invention.

Reactor 30 is illustrated in FIG. 2, and is comprised of a generally cylindrically shaped vessel 31 having a flange 32 at the upper end thereof and flange 33 at the lower end thereof. A circular top plate 34 is attached to vessel 31, such as by bolts through the outer perimeter of the top plate and the upper flange 32. Similarly, a bottom plate 35 plate 35 is attached to vessel 31 by suitable means, such as bolts extending through the outer periphery thereof and through the lower flange 33. Agitator shaft 36 extends through a centrally located hole 37 in upper plate 34, which said hole 37 is fitted with a mechanical seal assembly. The lower end of agitator shaft 36 is guided in its lower portion by glass-impregnated-teflon foot bearing 38. Agitator shaft 36 is driven by suitable motor means 39. Cylindrical rotor 40 is located on agitator shaft 36, as illustrated.

Reaction vessel 31 is surrounded by jacket 44, wherein cooling or heating liquid may be circulated. Inlet conduit 45 permits introduction of reaction medium into the reaction vessel 31. Monomer is introduced through sparger 46, and excess monomer exits through outlet 47. Serum cap 48 permits introduction of the catalyst and other materials in small quantities into the reaction vessel 31. A thermocouple not illustrated may be inserted into the reaction vessel at any suitable location to monitor temperature.

In operation, where the polymerization is carried out in the reactors, they are first flushed with nitrogen and then the reaction medium introduced. The reaction medium was then saturated with the olefin monomer, and a slight positive pressure maintained in the reaction vessel with monomer. The catalyst was next added via the serum cap, with the aluminum alkyl being added first. Where agitation was employed, it was maintained throughout the polymerization. Polymerization was quenched by injecting isopropanol (FIG. 1) or ethanol (FIG. 2) into the reaction medium via the serum cap.

The catalysts themselves were prepared in the manner conventional in the art. Reference is made to copending application Ser. No. 874,687 and to the previously cited patents on the Ziegler, Phillips and Standard Oil processes, as well as standard texts for further description on catalyst preparation.

The reaction medium employed may be any of those solvents meeting the solubility parameter criteria described previously. Exemplary of suitable solvents employable as the reaction medium in the process for forming gels of polyethylene and polypropylene are cyclohexane, decalin, heptane, tetralin, chlorinated solvents, toluene, isooctane, m, o and p-xylene, mineral oils, Socal 1 (a mixture of normal and branched aliphatic hydrocarbons, naptha and aromatics), aliphatic hydrocarbons such as hexane, and mixtures thereof.

As mentioned previously, the polyolefin solution need not be formed directly by polymerizing in the reactor, but may be preformed polymer which is then dissolved in the solvent above the melt dissolution temperature. That is, a crystalline polyolefin may be obtained from any suitable source, placed into a suitable vessel along with a solvent, and the mixture raised above the melt dissolution temperature to form the polymer solution.

The examples which follow illustrate various aspects of the invention, but are not to be construed as limiting the invention more narrowly than is stated in the claims.

In all of the tables, the catalysts are identified by code as follows:

1 - $VOCl_3 + (C_2H_5)_3Al$
2 - $VOCl_3 + (C_2H_5)_2AlCl$
3 - $TiCl_4 + (C_2H_5)_3Al$

In all of the tables, "catalyst concentration" refers to the concentration of the transition metal halide.

In all of the tables, the solvents are abbreviated as follows:

$n-C_{14}$ = n-tetradecane
dec = decalin
tet = tetralin
$n-C_8$ = n-octane
$i-C_8$ = isooctane (2, 2.4-trimethylpentane)
c-hex = cyclohexane
xyl = Matheson, Coleman & Bell reagent grade xylene
$O-C_6H_4Cl_2$ = ortho dichloro benzene
DMSO = dimethyl sulfoxide The shear stress reported in the examples was calculated from experimentally measured torque values. The shear stress ($\tau$) in the annular space between the rotor and the wall of the reaction vessel was determined by the following equation:

$$\tau = \mu \cdot (dv/dr) \cdot (1/g) = T/2\, r_c^2\, L$$

where $\mu$ = reaction fluid viscosity (lb. mass/(ft.)(sec.))

$g$ = gravitational constant where $T$ = measured net torque of rotor cylinder (ft.-lb.(force))

$L$ = length of wetted rotor cylinder (ft.)

$r_c$ = radius of rotor cylinder (ft.)

In employing the foregoing equation to determine shear stress, the measured net torque is corrected to remove "dead load", i.e., the measured torque is reduced by that amount attributable to solvent and bearing drag.

The molecular weights reported in the examples are viscosity-average molecular weights ($\overline{M}_v$).

The viscosity average molecular weights in the following examples are determined by the relationship:

$(\nu) = K\,M_v{}^a$ where $(\nu)$ = intrinsic viscosity, and is determined by Martin's equation (set forth on p. 207 of the book "Addition Polymers" by D. A. Smith, Plenum Press, N.Y. 1968. In Martin's equation, the $k$ for high density polyethylene has been determined empirically to be 0.63 and for polypropylene to be 0.81). The specific viscosity used in Marrtequation was usually first corrected for shear rate, using the relationship of Francis et al. (J. Polymer Sci., 31, 453 (1958)).

$K$ = constant, from literature $a$ = constant, from literature. For polyethylene, the values of Chiong (J. Polym. Sci., 36, 91 (1959)) were used; for polypropylene, the values of Redlich were used (J. Polym. Sci., Al, 393 (1963)).

Experimental viscosity measurements for use in determining viscosity average molecular weights in accordance with the foregoing equation were made in decalin at 135°C. using Ubbelohde No. 50 or 75 viscometers.

The apparent specific reaction rate $dM/C\,dt$ reported in the examples employing the apparatus of FIG. 1 was determined by dividing the monomer consumption (in millimoles) by the time increment (in seconds) and the catalyst amount (in millimoles). The different $dM/C\,dt$ values for each time increment measured are then weighted by the fraction of polymer produced in that interval, and an average $dM/C\,dt$ calculated. With the examples employing the apparatus of FIG. 2 the value of $dM/C\,dt$ was determined by dividing the polymer yield (in millimoles of monomer) by total reaction time (in seconds) and catalyst amount in millimoles. The apparent specific reaction rate is referred to in all of the examples as "reaction rate".

Fibers produced from vrious molecular weight polyolefins were formed into nonwoven sheets and tested for various parameters conventional in the papermaking art. These parameters are caliper (TAPPI Standard Test No. T411 os-68), opacity/and scattering coefficient (TAPPI Standard Test No. T425 m-60), breaking length (TAPPI Standard Test No. T-494), stretch (TAPPI Standard Test No. T-494) rupture energy (TAPPI Standard Test No. T-494), and tear factor (TAPPI Standard Test No. T-220). The fibers were prepared for nonwoven web formation by suspending about 0.25 gram of the fibrous gel (dry weight of fibers) in about 300 ml. of isopropanol, beating for 5 seconds in a 1-quart Waring blender at 10,000 rpm, refining for 4 minutes in a miniature disc refiner, with the gap for 2 minutes at 0.057 inch and for 2 minutes at 0.014 inch at 8,000–10,000 rpm. The miniature disc refiner is merely a modified 1-pint Waring blendor wherein the blades are replaced with a disc 23.87 mm in diameter, 6.35 mm thick and having four equally spaced groove20.32 mm long, 1.016 mm deep and 4.57 mm wide machined into the upper surface thereof whose center lines are offset 4.06 mm from the center of the disc, and which has stationary disc centered thereover and adjustable vertically up and down to vary the gap between the discs, the upper stationary disc having the same diameter as the moving, lower disc, is 8.89 mm thick and has six equally spaced holes extending therethrough from the upper surface to the lower surface, the holes being 6.35 mm in diameter and being located 11.93 mm from the center of the disc. To the resulting slurry of free-floating fibers is added 50 ml. of isopropanol, and the slurry drained by suction through a No. 54 Whatman filter paper placed on top of a wire mesh screen 72 mm in diameter removably located at the bottom of a stainless steel cylinder 10 cm. high, the slurry being stirred prior to removal of the isopropanol with a perforated stirrer. The resulting nonwoven web is placed between standard TAPPI blotters and pressed for 3 minutes at 118 pounds per square inch of sheet. The filter paper is removed from the handsheet, and the handsheet pressed at 185° F. (85° C.) at 31.25 pounds per square inch of sheet for 5 minutes. New blotters are employed and the nonwoven sheet pressed for an additional 5 minutes under the same conditions.

EXAMPLE 1

Molecular Weight

This example illustrates the desirability of employing polyolefins having high molecular weights to obtain fibers of suitable strength for preparation of satisfactory nonwoven sheets. Table 1A below shows the effect of molecular weight on polyethylene fiber sheets produced by polymerization of ethylene in the reaction media under the conditions stated. Table 1B below shows the effect of molecular weight where preformed polyethylene is employed in forming fibers. Table 1C below shows the effect of molecular weight where preformed polypropylene is employed in forming fibers.

It is seen from the tables that molecular weight of the polyolefin has an important effect on fiber properties. For polyethylene, the molecular weights of runs 1, 7, 8 and 9 give fibers on the borderline of satisfactory strength properties for use in nonwoven webs. For polypropylene, the molecular weights of runs 16, 17, 18 and 19 are on the borderline of giving satisfactory fibers. However, it should be noted that while such fibers may be borderline for use in nonwoven webs, they are useful for other purposes. In addition, strength additives could be employed to render them suitable to nonwoven web purposes.

TABLE 1A

VARYING MOLECULAR WEIGHT (POLYETHYLENE)

| RUN NO. | 1 | 2 | 3 | 4 | 5 | 6 |
|---|---|---|---|---|---|---|
| POLYMERIZATION CONDITIONS | | | | | | |
| Solvent | i — $C_8$ | C — hex | C — hex | C — hex | i — $C_8$ | C — hex |
| Catalyst | 3 | 3 | 2 | 2 | 2 | 2 |
| Catalyst Concentration (Millimoles/Liter) | 1.0 | 0.877 | 0.1 | 0.1 | 0.1 | 0.1 |
| Al/Ti or Al/V | 1.5:1 | 1.5:1 | 12:1 | 12:1 | 12:1 | 12:1 |
| Temperature, °C. | 139 | 138 | 138 | 138 | 139 | 127 |
| Time (Min.) | 4 | 4 | 4 | 4 | 4 | 15 |
| Pressure (psig) | 104 | 100 | 100 | 100 | 106 | 120 |
| Rotor Speed (rpm) | 500 | 500 | 1000 | 500 | 1100 | 1000 |
| Reaction Rate (Sec.$^{-1}$)* | 1.1 | 0.012 | 6.7 | 4.1 | 8.3 | — |
| Phase Change Conditions | | | | | | |
| Temperature, °C | 132 | 107 | 118 | 107 | 93 | 131 |
| Rotor Speed (rpm) | 500 | 500 | 1000 | 500 | 1100 | 780 |
| Solution Viscosity, centipoises | — | — | 1700 | 575 | 238 | 2150 |
| Shear Stress, lb(f)/ft.$^2$ | — | — | 6.25 | 1.0 | 1.0 | 6.2 |
| $(S_s - S_p)^2$ cal/cc | 3.88 | 0.47 | 0.18 | 0.47 | 3.16 | 0.757 |
| Cooling Rate (°/min) | 6.5 | 13.2 | 9.5 | 4.2 | 2.8 | 0.5 |

*Apparent specific reaction rate (dm)/C dt)

| | 1 | 2 | 3 | 4 | 5 | 6 |
|---|---|---|---|---|---|---|
| POLYETHYLENE | | | | | | |
| Yield (grams) | 28.0 | 0.4 | 25.5 | 10.5 | 21.0 | 69.0 |
| % POLYETHYLENE (weight) in gel | — | — | 4.0 | — | — | 12.0 |
| Molecular weight × $10^{-6}$ | 0.30 | 0.51 | 0.66 | 1.4 | 1.86 | 2.15 |
| Surface Area (m²/g) | 25.8 | 53.7 | 31.5 | 58.9 | 47.5 | 48.7 |
| Description ** | 1 | 2 | 2 | 2 | 2 | 2 |
| $(\eta)$, dl/g | 3.2 | 4.5 | 5.4 | 8.9 | 10.8 | 11.9 |
| Tm°C | 131 | 131 | 133 | 136 | 132 | 137 |
| % Crystallinity | — | — | 74 | 79 | — | 73 |
| Handsheet Properties | | | | | | |
| Caliper (mils) | 5.8 | — | 4.3 | 4.4 | 5.9 | 4.6 |
| Tear Factor | 0 | — | 46.5 | 62.0 | 55.0 | 57.0 |
| Breaking Length (meters) | 589 | 962 | 1988 | 2177 | 1739 | 2070 |
| Rupture Energy, ft. lbs./sq.ft. | 0.1 | 0.9 | 6.8 | 65.7 | 32.5 | 24.7 |
| Opacity, % | 93 | 65 | 74 | 34 | 92 | 75 |
| Scattering Coefficient, cm²/g | 781 | 139 | 264 | 66 | 801 | 286 |

** 1 = Structureless gel  
   2 = Fibrous gel ) These description codes are used in all tables.  
   3 = Crumb Notes:
Runs 1-6 made in reactor of FIG. 2, cylindrical rotor.
Use of — in tables indicates value not determined.

TABLE 1B

VARYING MOLECULAR WEIGHT (PREFORMED POLYETHYLENE)

| RUN NO. | 7 | 8 | 9 | 10 | 11 | 12 | 13 | 14 | 15 |
|---|---|---|---|---|---|---|---|---|---|
| SOLUTION CONDITIONS | | | | | | | | | |
| Solvent | xyl | xyl | xyl | n—$C_{14}$ | xyl | xyl | xyl | xyl | xyl |
| Polyethylene Concentration (%) (grams/ml) × 100 | 1.0 | 1.0 | 1.0 | 1.0 | 1.0 | 1.0 | 1.0 | 1.0 | 1.0 |

TABLE 1B — Continued

VARYING MOLECULAR WEIGHT (PREFORMED POLYETHYLENE)

| RUN NO. | 7 | 8 | 9 | 10 | 11 | 12 | 13 | 14 | 15 |
|---|---|---|---|---|---|---|---|---|---|
| Temperature, °C. | 85 | 98 | 90–93 | 105–108 | 114 | 94 | 90 | 92 | >103 |
| PE Molecular Weight × $10^{-6}$ | 0.06 | 0.06 | 0.08 | 0.17 | 0.23 | 0.44 | 0.77 | 0.95 | 6.7 |
| Phase Change Conditions | | | | | | | | | |
| Temperature, °C. | 72 | 77 | 74 | 88 | 98 | 93 | 84 | 86 | 82 |
| Rotor Speed (rpm) | 850 | 910 | 775 | 900 | 975 | 740 | 750 | 860 | 1000 |
| $(S_s - S_p)^2$ cal./cc. | 0.07 | 0.06 | 0.07 | 0.04 | 0.46 | 0.03 | 0.04 | 0.04 | 0.05 |
| Cooling Rate (°/min) | 1.2 | 0.8 | 0.8 | 0.9 | — | 1.1 | 1.9 | 1.0 | 1.9 |
| Polyethylene | | | | | | | | | |
| % Polyethylene (weight) in gel | 12.0 | 7.0 | — | 5.0 | 10.0 | 5.0 | 5.0 | 7.0 | 5.0 |
| Description | 3. | 3 | 3 | 2 | 2 | 2 | 2 | 2 | 2 |
| ($\eta$) dl/g | 1.1 | 1.0 | 1.3 | 2.2 | 2.7 | 4.1 | 6.0 | 6.8 | 25.1 |
| Tm°C. | 122 | — | 127 | 127 | 120 | 125 | 127 | 126 | 130 |
| Surface Area (m²/g) | — | 9.6 | 8.2 | 15.8 | 3.9 | 24.5 | 14.5 | 33.9 | 20.9 |
| Handsheet Properties | | | | | | | | | |
| Tear Factor | * | * | * | 45 | 100 | 41 | 45 | 70 | 49 |
| Breaking Length (meters) | * | * | * | 231 | 1087 | 1422 | 1981 | 801 | 1180 |
| Rupture Energy, ft. lbs./sq. ft. | * | * | * | 0.04 | 2.3 | 2.8 | 7.4 | 1.7 | 2.4 |
| Stretch (%) | * | * | * | 1.2 | 7.2 | 6.8 | 13.3 | 5.6 | 4.9 |
| Opacity, % | * | * | * | 95 | 88 | 85 | 87 | 89 | 92 |
| Scattering Coefficient, cm²/g | * | * | * | 1171 | 583 | 469 | 467 | 700 | 584 |

*Too weak to test
Note: Runs 7–15 made in reactor of figure 1.
In all tables the percent crystallinity of the polyethylene fibers and the nonfibrous polymer (crumb) was obtained by measuring the enthalpy of melting with a Perkin DSC-1 B differential scanning calorimeter at a scanning rate of 2.5°C/Minute. The value obtained was then divided by 68.4 calories per gram, the value for 100% crystalline polyethylene. The crystalline melting points ($T_m$) were taken as the peak of the enthalpy curve.

TABLE 1C

VARYING MOLECULAR WEIGHT (PREFORMED POLYPROPYLENE)

| RUN NO. | 16 | 17 | 18 | 19 | 20 | 21 |
|---|---|---|---|---|---|---|
| Solution Conditions | | | | | | |
| Solvent | dec | n–$C_{14}$ | C — hex | C — hex | C — hex | C — hex |
| Polypropylene Concentration (%) (grams/ml)×100 | 1.0 | 1.0 | 1.0 | 1.0 | 1.0 | 1.0 |
| Temperature, °C | 123 | 139 | — | — | — | — |
| PP Molecular Weight ×$10^{-6}$ | 0.13 | 0.12 | 0.12 | 0.16 | 0.46 | 0.57 |
| Phase Change Conditions | | | | | | |
| Temperature, °C | 51 | 92 | 42 | 44 | 40 | 54 |
| Rotor Speed (rpm) | 1140 | 900 | 1000 | 1000 | 1000 | 1000 |
| $(S_s - S_p)^2$ cal/cc | 0.34 | 0.06 | 0.04 | 0.04 | 0.05 | 0.05 |
| Cooling Rate (°/min) | 3.9 | 0.77 | 14.0 | 15.0 | 13.0 | 4.0 |
| Polypropylene | | | | | | |
| % Polypropylene (weight) in gel | — | 10.0 | 14.0 | 9.0 | 10.0 | 8.0 |
| Description | 3 | 2 & 3 | 2 & 3 | 2 & 3 | 2 & 3 | 2 & 3 |
| ($\eta$) (dl/g) | 1.3 | 1.1 | 1.1 | 1.3 | 2.5 | 3.0 |
| Tm°C | 167 | 159 | 165 | 165 | 165 | 169 |
| Surface Area (m²/g) | 3.9 | 7.3 | 10.2 | 101.0 | 20.9 | 91.1 |
| ΔH (cal/g) | 38 | 12 | 14 | 22 | 16.7 | 36 |
| Handsheet Properties | | | | | | |
| Tear Factor | * | 0 | 13 | 9 | 25 | — |
| Breaking Length (meters) | * | 835 | 1387 | 876 | 2185 | 2238 |
| Rupture Energy, ft. lbs./sq. ft. | * | 0.1 | 0.7 | 0.3 | 3.0 | 8.5 |
| Opacity, % | * | 81 | 86 | 86 | 79 | 82 |
| Scattering Coefficient, cm²/g | * | 401 | 557 | 539 | 383 | 368 |

*Too weak to test
Note:
Runs 16 and 17 made in reactor of FIG. 1.
Other runs (18–21) made in reactor of FIG. 2, cylindrical rotor.

EXAMPLE 2

Varying Shear Stress

The runs reported in tables 2A and 2B show the effect on fibrous gel formation and fiber properties of varying shear stress during cooling of the polyethylene solution. As can be seen from table 2A, imparting shear stress to the polyethylene solution during cooling is not essential to fibrous gel formation where the polyethylene solution has been maintained below the molecular randomization temperature, but does aid in improving strength properties of the fibers produced therefrom.

Table 2B shows that some shear stress is necessary where the polyethylene solution is heated above the temperature of molecular randomization. Run 31 was subjected to shear stress and formed a fibrous gel whereas Run 32 was not and did not form a gel but a floc. Run 33 illustrates that shear stress during polymerization is not essential.

TABLE 2A

VARYING SHEAR STRESS

| Run No. | 22 | 23 | 24 | 25 | 26 | 27 | 28 | 29 | 30 |
|---|---|---|---|---|---|---|---|---|---|
| Polymerization Conditions | | | | | | | | | |
| Solvent | C—hex | C—hex | i — $C_R$ | C—hex | C—hex | C—hex | C—hex | C—hex | C—hex |
| Catalyst | 1 | 2 | 2 | 2 | 2 | 2 | 2 | 2 | 2 |
| Catalyst Concentration (Millimoles/Liter) | 0.1 | 0.5 | 0.1 | 0.1 | 0.02 | 0.1 | 0.004 | 0.1 | 0.1 |
| Al/V | 6:1 | 12:1 | 12:1 | 12:1 | 12:1 | 12:1 | 12:1 | 12:1 | 12:1 |
| Temperature, °C | 138 | 138 | 139 | 138 | 138 | 138 | 138 | 127 | 138 |
| Time (Min.) | 60 | 4 | 4 | 4 | 4 | 4 | 4 | 15 | 4 |
| Pressure (psig) | 100 | 100 | 106 | 100 | 100 | 100 | 100 | 120 | 100 |
| Rotor Speed (rpm) | 0 | 90 | 1100 | 500 | 1200 | 200 | 1100 | 1000 | 1000 |
| Reaction Rate (Sec$^{-1}$) | 0.82 | 5.0 | 8.3 | 4.1 | 9.9 | 7.2 | 15.0 | — | 6.7 |
| Phase Change Conditions | | | | | | | | | |
| Temperature, °C | — | 113 | 93 | 107 | 110 | — | 104 | 123 | 118 |
| Rotor Speed (rpm) | 0 | 70 | 1100 | 500 | 500 | 200 | 900 | 750 | 1000 |
| Solution viscosity, centipoises | — | 3490 | 238 | 575 | 733 | 2090 | 581 | 2360 | 1700 |
| Shear Stress, lb(f)/ft.$^2$ | 0 | 0.89 | 1.0 | 1.0 | 1.3 | 1.5 | 1.9 | 6.2 | 6.25 |
| $(S_s-S_p)^2$ cal/cc | 0.69 | 0.54 | 3.16 | 0.47 | 0.51 | 0.5 | 0.44 | 0.54 | 0.2 |
| Cooling Rate (°/min) | 3.2 | 3.3 | 2.8 | 4.2 | 13.4 | — | 16.6 | 0.5 | 9.5 |
| Polyethylene | | | | | | | | | |
| Yield (grams) | 11.8 | 83.0 | 21.2 | 10.5 | 5.0 | 27.7 | 1.5 | 69.0 | 25.5 |
| % Polyethylene (weight) in gel | — | 7.0 | — | — | 5.0 | 6.0 | 22.0 | 11.0 | 6.0 |
| Description | 1 | 2 | 2 | 2 | 2 | 2 | 2 | 2 | 2 |
| Molecular weight ×10$^{-6}$ | 1.33 | 2.0 | 1.86 | 1.4 | 1.48 | 1.7 | 2.8 | 2.15 | 0.66 |
| Surface Area (m$^2$/g) | 24.8 | 23.9 | 47.5 | 58.9 | 67.2 | 17.1 | 53.1 | 48.7 | 31.5 |
| $(\eta)$ dl/g | 8.6 | 11.5 | 10.8 | 8.9 | 9.2 | 10.2 | 14.0 | 11.9 | 5.4 |
| Tm°C | 131 | 132 | 132 | 136 | 137 | 132 | 139 | 137 | 133 |
| % Crystallinity | — | 67 | — | 79 | 76 | 69 | 59 | 73 | 74 |
| Handsheet Properties | | | | | | | | | |
| Tear Factor | 26 | 34 | 54.4 | 62 | 79 | 31 | 184 | 57 | 47 |
| Breaking Length (meters) | 1616 | 1745 | 1739 | 2177 | 2287 | 1746 | 1170 | 2070 | 1988 |
| Rupture Energy, ft. lbs./sq. ft. | 1.6 | 10.0 | 32.5 | 68.0 | 6.8 | 3.2 | 1.4 | 24.7 | 6.8 |
| Stretch (%) | 3.7 | 14.0 | 46.0 | 71.5 | 9.2 | 7.7 | 4.1 | 27.0 | 12.4 |
| Opacity, % | 84 | 77 | 92 | 34 | 72 | 73 | 80 | 75 | 74 |
| Scattering Coefficient, cm$^2$/g | 530 | 334 | 800 | 66 | 264 | 281 | 358 | 286 | 264 |

Note: Runs 22–30 made in reactor of FIG. 2, cylindrical rotor.

TABLE 2B

EFFECT OF TEMPERATURE AND SHEAR STRESS ON FIBROUS GEL FORMATION

| Run No. | 31 | 32 | 33 |
|---|---|---|---|
| Polymerization Conditions | | | |
| Solvent | C—hex | C—hex | i—$C_R$ |
| Catalyst | 2 | 2 | 2 |
| Catalyst Concentration (Millimoles/Liter) | 0.1 | 0.1 | 0.1 |
| Al/V | 12:1 | 12:1 | 12:1 |
| Temperature, °C | 160 | 166 | 138 |
| Time (Min.) | 4 | 4 | 4 |
| Pressure (psig) | 120 | 120 | 104 |
| Rotor Speed (rpm) | 1100 | 0 | 0 |
| Reaction Rate (Sec$^{-1}$) | 0.62 | 1.7 | 2.2 |
| Phase Change Conditions | | | |
| Temperature, °C | — | — | 121 |
| Rotor Speed (rpm) | 1100 | 0 | 1011 |
| Shear Stress, lb(f)/ft.$^2$ | — | 0 | — |
| $(S_s-S_p)^2$ cal/cc | — | — | 3.67 |
| Cooling Rate (°/min) | 7.4 | 4.0 | 10.5 |
| Polyethylene | | | |
| Yield (grams) | 1.6 | 4.4 | 5.6 |
| Description | 2 | 3 | 2 |
| Molecular weight ×10$^{-6}$ | 1.09 | 1.12 | 2.78 |
| Surface Area (m$^2$/g) | — | 31.7 | 7.0 |
| $(\eta)$ dl/g | 7.5 | 7.7 | 14.1 |
| Tm°C | 132 | 133 | 134 |
| Handsheet Properties | | | |
| Tear Factor | 74 | 29 | 50 |
| Breaking Length (meters) | 1899 | 1656 | 1703 |
| Rupture Energy, ft. lbs./sq. ft. | 7.8 | 4.8 | 14.9 |
| Stretch (%) | 13.8 | 8.2 | 21.8 |
| Opacity, % | 72 | 82 | 82 |
| Scattering Coefficient, cm$^2$/g | 262 | 421 | 455 |

Note: Runs 31–33 made in reactor of FIG. 2, cylindrical rotor.

EXAMPLE 3

Varying Catalyst and Polyethylene Concentration

The runs reported in Table 3 below illustrate that catalyst concentration has little effect on fibrous gel formation. Any catalyst concentration normally employed in the art may be employed in the present process. It is also seen that the concentratiaon of polyethylene in the solution is almost directly proportional to the catalyst concentration, i.e., as catalylst concentration increases, the polyethylene concentration in the solution increases. Two runs (35P and 36P) were made with preformed polyethylene of high molecular weight for comparison to the other runs.

While in Table 3 the polyolefin concentration in solution is shown to vary up to about 2% by weight, higher concentrations may be employed. The upper limit on polymer concentration in the solution is dictated by the necessity of forming a gel upon cooling and by viscosity considerations, i.e., a solution containing above about 15% by weight polyolefin becomes extremely viscous. Therefore, it is desirable to employ polyolefin concentrations less than about 15%, and preferably less than about 5% by weight of provide a viscosity less than about 500 centipoises. There does not appear to be any lower limit on polyolefin concentration.

TABLE 3

VARYING CATALYST AND POLYETHYLENE (PE) CONCENTRATION

| RUN NO. | 34 | 35 | 35 P | 36 | 36 P | 37 |
|---|---|---|---|---|---|---|
| Polymerization Conditions | | | | | | |
| Solvent | C — hex | C — hex | xyl | C — hex | xyl | C — hex |
| Catalyst | 2 | 2 | | 2 | | 2 |
| Catalyst Concentration (Millimoles/Liter) | 0.004 | 0.02 | | 0.1 | | 0.5 |
| Al/V | 12:1 | 12:1 | | 12.1 | | 12.1 |
| Temperature, °C | 138 | 138 | | 138 | | 138 |
| Time (Min.) | 4 | 4 | | 4 | | 4 |
| Pressure (psig) | 100 | 100 | | 100 | | 100 |
| Rotor Speed (rpm) | 1100 | 1200 | | 200 | | 90 |
| Reaction Rate (Sec$^{-1}$) | 15.0 | 9.9 | | 7.2 | | 5.0 |
| Phase Change Conditions | | | | | | |
| Temperature, °C | 104 | 110 | 64 | 109 | 92 | 113 |
| Rotor Speed (rpm) | 900 | 500 | 1000 | 200 | 950 | 70 |
| Solution Viscosity, centipoises | 581 | 733 | — | 2090 | — | 3500 |
| Shear Stress, lb(f)/ft.$^2$ | 1.9 | 1.3 | — | 1.5 | — | 0.89 |
| (Ss-Sp)$^2$ cal/cc | 0.44 | 0.5 | 0.09 | 0.5 | 0.02 | 0.5 |
| Cooling Rate (°/min) | 17.0 | 13.4 | 0.9 | — | 1.0 | 3.0 |
| PE conc (g/dl) | 0.04 | 0.13 | 0.3 | 0.49 | 1.0 | 1.67 |
| Polyethylene | | | | | | |
| Yield (grams) | 1.5 | 5.0 | 1.5 | 27.7 | 5.0 | 63.0 |
| % Polymer (weight) in gel | 22.0 | 5.0 | — | 6.0 | — | 7.0 |
| Description | 2 | 2 | 2 | 2 | 2 | 2 |
| Molecular weight ×10$^{-6}$ | 2.8 | 1.48 | 1.1 | 1.72 | 2.1 | 2.0 |
| Surface Area (m$^2$/g) | 53.1 | 67.2 | — | 17.1 | — | 23.9 |
| ($\eta$), dl/g | 14 | 9.2 | 7.7 | 10.2 | 11.5 | 11.5 |
| Tm°C | 139 | 137 | — | 132 | — | 132 |
| % Crystallinity | 59 | 76 | — | 69 | — | 67 |
| Handsheet Properties | | | | | | |
| Tear Factor | 184 | 79 | 254 | 31 | 100 | 34 |
| Breaking Length (meters) | 1170 | 2287 | 1473 | 1746 | 2172 | 1745 |
| Rupture Energy, ft. lbs./sq. ft. | 1.4 | 6.8 | 1.6 | 3.2 | 13.0 | 10.0 |
| Stretch (%) | 4.1 | 9.2 | 3.3 | 7.7 | 15.3 | 13.7 |
| Capacity, % | 80 | 72 | 77 | 73 | 85 | 77 |
| Scattering Coefficient, cm$^2$/g | 358 | 264 | 348 | 281 | 539 | 334 |

Note:
Runs 34–37 made in reactor of FIG. 2, cylindrical rotor. Runs 35P & 36P were made with preformed polyethylene in the reactor of FIG. 1.

EXAMPLE 4

Effect of solubility Parameter

In the runs reported in Table 4 below, polymerization of ethylene or dissolution of preformed polyethylene was carried out in various solvents to illustrate the effect of solubility parameter upon fibrous gel formation and fiber properties. Runs 38, 40, 42 and 43 were polymerization runs and the other runs were dissolution runs wherein polyethylene was dissolved in the solvent at an elevated temperature. It is seen that in Run 47 wherein DMSO was the solvent that the solubility parameter thereof is too close to the outer limits of suitability, and only crumb was obtained instead of fibrous gel.

HIGHER PRESSURE RUNS

For producing polyolefin fibers at higher pressures, a steam jacketed, batch autoclave reactor of approximately one gallon capacity (Benco Model 575 PJ having a ¼ horsepower variable speed type R drive) was employed. The warmed autoclave is purged for about 4 hours with nitrogen, and 1 gallon of cyclohexane (purified by running it through a molecular sieve column) introduced using nitrogen pressure to force it from the reservoir into the reactor. Steam was introduced into the jacket of the autoclave to bring the cyclohexane up to reaction temperature. Ethylene gas was then introduced to the reactor with a slight amount of venting through the relief valve to provide a small ethylene purge. The stirrer (a curved blade turbine having six

TABLE 4

| Run No. | 38 | 39 | 40 | 41 | VARYING SOLVENT 42 | 43 | 44 | 45 | 46 | 47 |
|---|---|---|---|---|---|---|---|---|---|---|
| Polymerization or Solution Conditions | | | | | | | | | | |
| Solvent | i—$C_8$ | n—$C_8$ | Nujol | n—$C_{14}$ | C—hex | dec. | xyl | tet | O—$C_6H_4Cl_2$ | DMSO |
| Catalyst | 2 | | 2 | | 2 | 3 | | | | |
| Catalyst Concentration (Millimoles/Liter) | 0.1 | | 0.2 | | 0.1 | 2.8 | | | | |
| Al/Ti or Al/V | 12:1 | | 50:1 | | 12:1 | 1.8:1 | | | | |
| Temperature, °C | 139 | 109 | 106 | 114 | 138 | 101 | 94 | 101 | 101 | 135 |
| Polyethylene Concentration (%) (grams/ml)×100 | | 1.0 | | 1.0 | | | 1.0 | 1.0 | 1.0 | 1.0 |
| Ss (25°C) | 6.85 | 7.55 | 7.6 | 7.93 | 8.18 | 8.58 | 8.84 | 9.49 | 10.04 | 11.85 |
| (Ss-Sp)$^2$ cal/cc | 3.16 | 1.4 | 0.55 | 0.47 | 0.18 | 0.002 | 0.03 | 0.89 | 1.5 | 4.1 |
| Reaction Rate (Sec$^{-1}$) | 8.3 | | 4.7 | | 6.7 | 0.06 | | | | |
| Phase Change Conditions | | | | | | | | | | |
| Temperature, °C | 93 | 96 | — | 103 | 118 | 86 | 93 | 36 | 85 | 126.5 |
| Rotor Speed (rpm) | 1100 | 900 | 1130 | 800 | 1000 | 2000 | 740 | 900 | 660 | 960 |
| Cooling Rate (°/min) | 2.8 | 1.0 | 6.7 | 1.1 | 9.5 | 7.1 | 1.1 | 0.9 | 0.7 | 1.8 |
| Polyethylene | | | | | | | | | | |
| Yield | 21 | | 0.6 | | 25.5 | 4.7 | | | | |
| % Polymer (weight) in gel | — | 6.0 | 12.0 | 5.0 | 6.0 | 5.0 | 5.0 | 7.0 | 3.0 | — |
| Description | 2 | 2 | 2 | 2 | 2 | 2 | 2 | 2 | 2 | 3 |
| Molecular weight ×10$^{-6}$ | 1.86 | 0.49 | 1.07 | 0.23 | 0.66 | 0.69 | 0.44 | 0.54 | 1.47 | 0.7 |
| Surface Area (m$^2$/g) | 47.5 | 41.3 | 6.1 | 3.9 | 31.5 | 7.1 | 24.5 | 1.6 | 4.3 | — |
| ($\eta$), dl/g | 10.8 | 4.4 | 7.5 | 2.7 | 5.4 | 5.5 | 4.1 | 4.7 | 9.2 | — |
| Tm°C | 132 | 125 | 132 | 120 | 133 | 137 | 125 | 131 | 131 | — |
| % Crystallinity | — | 61 | — | 74 | — | — | — | — | — | — |
| Handsheet Properties | | | | | | | | | | |
| Tear Factor | 54.5 | 40 | — | 100 | 47 | 50 | 41 | 63 | 56 | — |
| Breaking Length (meters) | 1739 | 1643 | 1516 | 1087 | 1988 | 487 | 1422 | 1757 | 1515 | — |
| Rupture Energy, ft.lb./sq.ft. | 32.5 | 4.0 | 2.2 | 2.3 | 6.8 | 0.4 | 2.8 | 4.8 | 3.0 | — |
| Opacity, % | 92 | 88 | 87 | 88 | 74 | 96 | 85 | 85 | 87 | 92 |
| Scattering Coefficient, cm$^2$/g | 800 | 625 | 510 | 583 | 264 | 998 | 469 | 487 | 553 | 617 |

Note: Runs 38 and 42 made in reactor of FIG. 2, cylindrical rotor. Other runs (39, 40, 41 and 43–47) made in reactor of FIG. 1. Runs 38, 40, 42 and 43 were runs wherein ethylene was polymerized in the reactor. Other runs (39, 41 and 44–47) employed preformed polyethylene dissolved in the solvent at the temperature indicated.

blades 3 inches in diameter and a blade height of three-eighths inch) was operated at 1500 rpm. Ethylene introduction was continued until the pressure in the reactor remained constant, indicating saturation of the cyclohexane. The relief valve and ethylene inlet line were then closed. About 10 c.c. of cocatalyst (triethyl aluminum) dissolved in cyclohexane was introduced into a reservoir having a rubber septum via hyperdermic syringe, and from the reservoir through a remotely controlled diaphragm operated needle valve into the reactor by nitrogen pressure slightly high (about 100 psi) than the pressure in the reactor. After about 30 seconds mixing about 10 c.c. of the catalyst (vanadium oxytrichloride) dissolved in cyclohexane was introduced into the reactor in a similar manner. The ratio of cocatalyst to catalyst (TEAL/VOCl$_3$) was 6/1. The introduction of the catalyst marks the beginning of the polymerization reaction. The reaction was terminated by injecting a catalyst poison (isopropanol) into the reactor in the same manner as the introduction of catalyst, and cocatalyst. The steam was then turned off and cooling water (about 55°F) circulated in the jacket. After the reactor had cooled to about room temperature, the relief valve was opened and excess pressure relieved. The fibrous gel product was then removed from the reactor. The results are as follows:

from sheets formed from fibers other than cellulose, such as staple fibers and split film fibers.

The amount of the present polyolefin fibers blended with other fibers, such as cellulose, may vary from as little as 2% up to 75% by weight or higher, preferably only up to about 50% by weight since the improvement in opacity obtained with higher amounts is incrementally much smaller.

EXAMPLE 6

SHEETS FORMED FROM BLENDS WITH CELLULOSE FIBERS HAVING IMPROVED OPACITY

Handsheets were prepared, as previously described, containing varying amounts of the polyethylene fibers of this invention blended with bleached kraft Douglas Fir cellulose fibers having a brightness of 80% and a Canadian Standard Freeness of 350 cc. The polyethylene fibers were such a size that about 80% by weight were retained on a 35 and 65 mesh screen (Tyler) when fractionated on a series of screens having 14, 20, 35, 65 and 150 mesh. A dispersing agent was added to aid in the dispersion of the polyethylene fibers in the aqueous slurry used in preparing the sheets. The results were as follows:

TABLE 5

| RUN NO. | 1 | 2 | HIGHER PRESSURE POLYMERIZATION ||||| 8 |
|---|---|---|---|---|---|---|---|---|
|  |  |  | 3 | 4 | 5 | 6 | 7 |  |
| Polymerization Conditions |  |  |  |  |  |  |  |  |
| Initial Pressure, atmospheres | 11.5 | 22 | 35 | 35 | 35 | 35 | 36 | 40 |
| Initial Temperature, °C | 140 | 140 | 134 | 136 | 136 | 140 | 136 | 138 |
| VCCl$_3$ (g. mmole/liter) | 0.026 | 0.026 | 0.026 | 0.026 | 0.026 | 0.026 | 0.026 | 0.026 |
| Reaction time (minutes) | 10 | 10 | 0.5 | 10 | 3 | 0.5 | 22 | 5 |
| Maximum temperature (°C) | 144 | 170 | 175 | 147 | 142 | 147 | 165 | 173 |
| Reaction rate (Sec$^{-1}$) | 17.1 | 56.8 | 993 | 78.5 | 57.1 | 98.3 | 34.7 | 158 |
| Polyethylene |  |  |  |  |  |  |  |  |
| Yield (g) | 28.6 | 94.3 | 83 | 131.5 | 28.2 | 32.2 | 127.8 | 134.9 |
| Yield (g PE/g VCCl$_3$) | 1,650 | 5,500 | 4,800 | 7,600 | 1,630 | 19,000 | 7,400 | 7,800 |
| M$_r$×10$^{-6}$ | 1.3 | 1.4 | 1.9 | 1.4 | 5.5 | 4.0 | 1.8 | 1.4 |
| Handsheet Properties |  |  |  |  |  |  |  |  |
| Breaking Length, meters | 1028 | 1104 | 1404 | 796 | 1528 | 879 | 1264 | 1614 |
| Tear Factor | 73.9 | 55 | — | 43 | — | 96 | 117 | 60 |
| Rupture Energy ergs/cm$^2$ × 10$^{-4}$ | 6.0 | 3.0 | 8.9 | 2.0 | 8.2 | 4.2 | 2.8 | 3.0 |
| Scattering Coefficient* | 1500 | 350 | 876 | 1180 | 567 | 895 | 240 | 254 |

*Average of two handsheets tested.

The polyolefin fibers of the present invention when blended with other fibers and formed into sheets impart improved opacity to the sheet. This improved opacity is probably attributable to the large surface area of the fibers of this invention which provides improved light scattering. Particularly useful are blends of the polyolefin fiber of the present invention with cellulose fibers to impart improved opacity to paper sheets without causing the loss of strength normally obtained with conventional pigment fillers such as titanium dioxide. This improvement in opacity may also be obtained

TABLE 6

| PE Fibers (% by weight) | TAPPI Opacity, % | Basis Weight (pounds/3000 sq.ft.) | Caliper (Mils) |
|---|---|---|---|
| 0 | 63.9 | 37.5 | 3.2 |
| 25 | 91.7 | 38.5 | 4.5 |
| 50 | 97.3 | 37.0 | 5.2 |
| 75 | 98.3 | 37.2 | 7.2 |
| 100 | 98.5 | 38.5 | 8.7 |

EXAMPLE 7

Dye Receptivity

The polyolefin fibers of this invention have a remarkable ability to adsorb dye, in distinction to polyolefin staple which is not easily dyed. In this example, accurately weighed samples (0.1–0.5 gram) of various fibers were suspended in 50 ml. of water and well stirred while 100 ml. of a standard dye solution was added. The standard dye solution contains 0.01023 gram of Reactive Blue 86 per 100 ml. After stirring for 3 minutes, the mixture was made up to exactly 200 grams net weight with distilled water and filtered. The optical absorbance of the filtrate (D) is measured at 600 microns. A sample of the standard dye solution is diluted exactly 1:1 with water and its absorbance similarly measured ($D_0$). The optical density D of the sample filtrate and the dry weight W of the sample are used to calculate R, the dye receptivity, in grams of dye adsorbed per 100 grams of fiber sample by use of the following equation:

$$R = [(D_0 - D) \times 0.01023 \times 100]/(W \times 2 \times 0.40)$$

The results of testing the polyethylene fibers of this invention, polyethylene staple fibers (3 denier) and bleached kraft pulp (80 GE brightness) are reported in Table 7 below.

TABLE 7

| Fiber Sample | $D_0$ | D | W | R |
|---|---|---|---|---|
| PE Staple | 0.32 | 0.31 | 0.50 | 0.03 |
| Bleached Kraft | 0.4 | 0.38 | 0.11 | 0.23 |
| PE fibers of this invention * | 0.4 | 0.2 | 0.11 | 1.8 |

*These fibers had a $M_w$ of 1,500,000, a surface area of 49.8 m²/gram and a polyethylene density of 0.957.

EXAMPLE 8

Pigmented Fibers

This example illustrates that the fibers of the present invention may be pigmented. A high molecular weight linear polyethylene ($M_v$ = 600,000) was dissolved in cyclohexane in the apparatus of FIG. 2 (cylindrical rotor operating at 1100 rpm) at 150°C. The cyclohexane contained a dry suspension (Englehard's Ultrawhite 90 kaolin coating clay). The total clay and polyethylene weight was 60 grams and 5.7 liters of cyclohexane was employed. The solution was slowly cooled to room temperature with stirring, and a fibrous gel obtained. The fibrous gel was refined by two passes through a Sprout-Waldron disc refiner at 0.005 mil plate clearance. The resulting fibrous pulp was then solvent exchanged through isopropanol to water, and treated by the addition of 5% by weight (on the fibers) of starch to render the fibers water dispersible. Handsheets were made from the fibers in the standard manner. Ash content of the handsheets was measured to determine the clay loading level achieved. The results are as follows:

TABLE 8

| RUN NO. | Clay Loaded Sheets | | |
|---|---|---|---|
| | 1 | 2 | 3 |
| Nominal Clay, % | 10 | 30 | 50 |
| Actual Clay, % | 6.7 | 17.2 | 21.3 |
| Brightness, GE | 90.3 | 90.5 | 89.7 |
| Tappi Opacity | 95.4 | 96.5 | 95.6 |
| Scattering Coefficient | 1325 | 1592 | 1366 |
| Tensile | 1.3 | 1.4 | 1.0 |
| Rupture Energy | 0.4 | 0.4 | 0.2 |
| Tear Factor | 59.7 | 34.4 | 30.4 |

The fibers produced by the process of the present invention may be employed for those uses to which fibers are normally employed. The principal utility is in the areas of forming non-woven webs and in textile applications by spinning yarn from the fibers. Other uses include molding, insulation, coatings, laminate reinforcement and filter manufacture.

We claim:

1. A process for preparing polyolefin fibers comprising forming a solution of a polyolefin in a solvent at a temperature above the melt dissolution temperature of the polyolefin, subjecting the polyolefin solution to a shear stress of greater than about zero pounds (force)/ft² up to about 6.25 pounds (force)/ft² while cooling the polyolefin solution to a temperature below the melt dissolution temperature of the polyolefine, the magnitude of said shear stress being sufficiently great to precipitate the polyolefin as a fibrous gel having interconnecting capillary spaces filled with solvent intertwined within a fibrillar structure of fibrous polyolefin, and subsequently subjecting the fibrous gel formed during cooling to a shear stress of greater than about 0.1 pound (force/ft² thereby producing discrete, directly recoverable, polyolefin fibers without requiring further processing steps.

2. The process of claim 1, wherein the fibrous gel formed is subsequently subjected to shear stress forces by passing the gel through a disc refiner.

3. The process of claim 2, wherein the polyolefin has a viscosity average molecular weight greater than about 40,000.

4. The process of claim 2, wherein the polyolefin has a melt index of essentially zero.

5. The process of claim 2, wherein the polyolefin is selected from the group consisting of polyethylene, polypropylene and copolymers of ethylene and propylene.

6. The process of claim 2, wherein the solvent has a solubility parameter such that $(\delta_s - \delta_p)^2$ is less than about 3.0 cal/cc.

7. The process of claim 2, wherein the fibrous polyolefin is in the form of microfibrils, macrofibrils and fibers.

8. The process of claim 7, wherein the majority of the microfibrils have a diameter less than about 1.0 micron, the majority of the macrofibrils have a diameter between about 1 and about 20 microns and the majority of the fibers have a diameter greater than about 10 microns.

9. The process of claim 2, wherein the polyolefin solution is formed by polymerizing an olefin in the presence of a coordination catalyst system in the solvent at a temperature above the melt dissoluton temperature of the polyolefin to be formed.

10. The process of claim 9, wherein the coordination catalyst is of the Ziegler type.

11. The process of claim 10, wherein the Ziegler type catalyst comprises a catalyst selected from the group consisting of titanium trichloride, titanium tetrachloride, vanadium tetrachloride and vanadium oxytrichloride, and a cocatalyst selected from the group consisting of diethyl aluminum chloride and triethyl aluminum.

12. The process of claim 9, wherein the polymerization temperature is between the melt dissolution temperature and the temperature of molecular randomization.

13. The process of claim 9, wherein an excess of monomeric olefin is employed.

14. The process of claim 9, wherein the olefin is gaseous and the reaction medium is saturated with the olefin prior to introduction of the catalyst.

15. The process according to claim 9, wherein the polymerization is carried out in the absence of chain transfer agents to form a polyolefin of high molecular weight.

16. The process of claim 2, wherein a preformed polyolefin is dissolved in the solvent.

17. The process of claim 2, wherein the fibrillar structure of the fibrous gel produced during cooling is essentially in the form of macrofibrils and fibers.

* * * * *